United States Patent [19]

Owen

[11] Patent Number: 4,839,675
[45] Date of Patent: * Jun. 13, 1989

[54] CATCH AND RELEASE FISH DATA RECORDING SYSTEM

[76] Inventor: H. Drew Owen, 16 N. Bridlewood, Edmond, Okla. 73034

[*] Notice: The portion of the term of this patent subsequent to Jun. 28, 2005 has been disclaimed.

[21] Appl. No.: 181,269

[22] Filed: Apr. 13, 1988

Related U.S. Application Data

[63] Continuation of Ser. No. 66,269, Jun. 25, 1987, Pat. No. 4,753,031.

[51] Int. Cl.⁴ .................... G03B 29/00; A01K 97/00; G01G 19/00; G01G 23/00
[52] U.S. Cl. ......................................... 354/76; 354/81; 43/54.1; 206/315.11; 177/245
[58] Field of Search ............... 43/4, 54.1; 206/315.11, 206/569, 578, 579; 177/245; 346/107 R, 9; 354/75, 76, 80, 81

[56] References Cited

U.S. PATENT DOCUMENTS

| | | | |
|---|---|---|---|
| 2,251,335 | 8/1941 | Hargreaves | 354/76 |
| 3,851,720 | 12/1974 | Williams, Jr. | 177/3 |
| 3,902,182 | 8/1975 | Hillborg | 346/107 R |
| 4,342,038 | 7/1982 | Lemelson | 346/9 |
| 4,384,771 | 5/1983 | Sakurada et al. | 354/105 |
| 4,589,505 | 5/1986 | Takahashi | 177/2 |
| 4,601,355 | 7/1986 | Takahashi | 177/2 |
| 4,693,329 | 9/1987 | Hikita | 346/9 X |

FOREIGN PATENT DOCUMENTS

311614 5/1929 United Kingdom ............... 177/245

Primary Examiner—Nicholas P. Godici
Assistant Examiner—Carmine Cuda
Attorney, Agent, or Firm—Laney, Dougherty, Hessin & Beavers

[57] ABSTRACT

A device useful for recording data concerning fish which have been caught. The system includes a carrying case enclosing operative components of the system, including a weighing and measuring subassembly and a data readout display. These are located within one side of the two hinged-together parts of the carrying case. A pre-focused camera is secured in the opposite side of the case, and is carried upon an expandable support structure positionable to photograph a fish supported on the weighing and measuring subassembly, concomitantly with photographing of a digital readout display of the fish's weight, a scalar graphic portrayal of the width and length of the fish, and a digital readout of other important data regarding the fish. The system further includes a computer, computer keyboard and printer by which certain data concerning the fish and the fisherman can be input to the digital readout display, and concurrently printed on a printer tape.

14 Claims, 3 Drawing Sheets

CATCH AND RELEASE FISH DATA RECORDING SYSTEM

This is a continuation of co-pending application Ser. No. 066,269, filed on June 25, 1987, now U.S. Pat. No. 4,753,031.

FIELD OF THE INVENTION

This invention relates to information and data recording systems useful in wildlife conservation. More particularly, the invention relates to a system which can be employed by an angler for quickly and accurately recording all information of interest to the angler or to the conservationist about a fish which has been caught, and which enables the angler to thereafter quickly tag the fish and return it to its habitat.

BACKGROUND OF THE INVENTION Brief Description of the Prior Art

For many reasons, fishermen are increasingly reluctant to retain and clean their catches for consumption as food, or even for mounting as trophies. In the latter case, photographs and the testimony of witnesses present at the time of the catch have frequently been considered adequate to attest to the fisherman's success, at least until a serious challenge has been raised against which no adequate proofs have sometimes been forthcoming. Rather than retaining the fish, the fishermen have increasingly returned them to the waters in which they were caught. This has been particularly true with respect to the fish caught in fishing tournaments.

Icthyologists and aquatic biologists research the eating habits, the mating habits and other life functions of various species of fish, in part by tagging fish which have been caught. A recognizable or identifiable tag is secured to the fish so that if the fish is subsequently caught or retrieved for study, various important data can be derived from the fact of the first catching of the fish, the location at which that occurred and the time span which has elapsed between the first and second catching. In many cases, fishermen have cooperated in this effort by tagging fish which they have caught and released.

Where a fish which may be a trophy or record fish is caught, the fisherman often has no immediate means of provably recording the fact of the catch, and of recording important data concerning weight, length or perhaps other characteristics of interest. Seldom does a sport fisherman carry with him in the boat, a sensitive and accurate scales by which a trophy fish which has been caught can be weighed, and no means is usually available in the boat for making a linear measurement of the fish. These circumstances tend to discourage a fisherman who has caught a fish which is potentially a trophy from releasing the fish soon enough after it is caught to be assured that the fish will remain alive.

BRIEF DESCRIPTION OF THE PRESENT INVENTION

The present invention provides a portable, compact data recording system which enables a fisherman to make a complete photographic and printed record of all of the information of interest concerning a fish which has been caught. The equipment can be carried on board and used, in place, on a small fishing boat by a fresh water sport fisherman, and it requires no technical skill or training in order for it to be used.

Broadly described, the fish catch and release data recording system of the invention includes a carrying case which is made up of two parts or halves. These parts are hingedly connected along one edge for pivotal movement of the halves between a closed position and an open position, in which one of the halves extends substantially normal to the other half. Each of the parts or halves of the carrying case is hollow, and defines an interior cavity.

In one of the parts of the case, a weighing and measuring subassembly is mounted, and functions to weight and concurrently measure a fish in a way which permits visual observation of the fish at the time of its weighing. A photographic recordation of the fish, and the amount of its weight and its length and width, is thus facilitated. On this same side of the carrying case there is also located a data readout display which is electronically actuated as a result of data input through a keyboard located on the opposite or second side of the carrying case. This display functions to visually portray vital information concerning the fish, the fisherman, the location and the date and time of the catch.

On the second or opposite side of the carrying case, a prefocused camera is located, and is secured in the case by means of an expandable pedestal. The expandable pedestal enables the camera to be aimed at a fish suspended on the weighing and measuring subassembly disposed on the opposite side of the carrying case. A tripod mounting system is also provided to permit the entire case to be mounted on top of a tripod while the case is open, and, in this status, to permit the system to be used for recording certain information and data concerning a fish which has been caught, and identifying the fisherman who has caught it.

An important object of the present invention is to provide a data recording system which is sufficiently compact and portable to permit it to be carried on board a fishing boat by fishermen, and there utilized to photographically record information concerning a fish which has been caught after the system has been set up in the fishing boat for this purpose.

An additional object of the invention is to provide a fish catch and release data recording system which is portable and compact, and which can be used for photographing a fish which has been caught, concurrently with the photographing of certain information concerning the fisherman, the place of the catch and the length and width of the fish. A printed tab or tape which has printed thereon information concerning the fish and the fisherman is concurrently developed. This printed tape can be retained by the fisherman while the photographic negative is forwarded to an appropriate fish register, or official records repository, for development and recoding of the information thereon.

Another object of the invention is to provide a fish catch and release data recording system which will encourage and facilitate the maintenance of comprehensive records on fish which are caught, and will thus contribute significantly to the efforts of aquatic biologists to develop and maintain histories on fish, and information concerning their life habits.

Additional objects and advantages of the invention will become apparent as the following detailed description is read in conjunction with the accompanying drawings which illustate a preferred embodiment of the invention.

DETAILED DESCRIPTION OF A PREFERRED EMBODIMENT OF THE INVENTION

Figure 1:
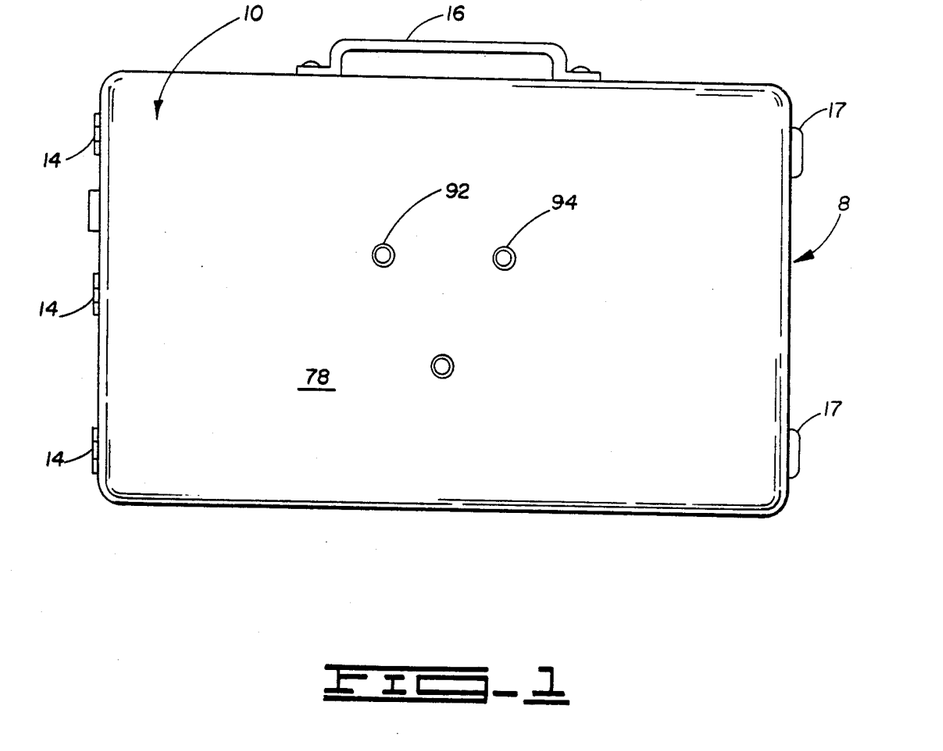
FIG. 1 is a side elevation view of the carrying case forming a part of the catch and release fish data recording system of the present invention, and showing the carrying case as one side of it appears in elevation, and illustrating three tripod receiving sleeves located on such side of the carrying case.
Figure 2:
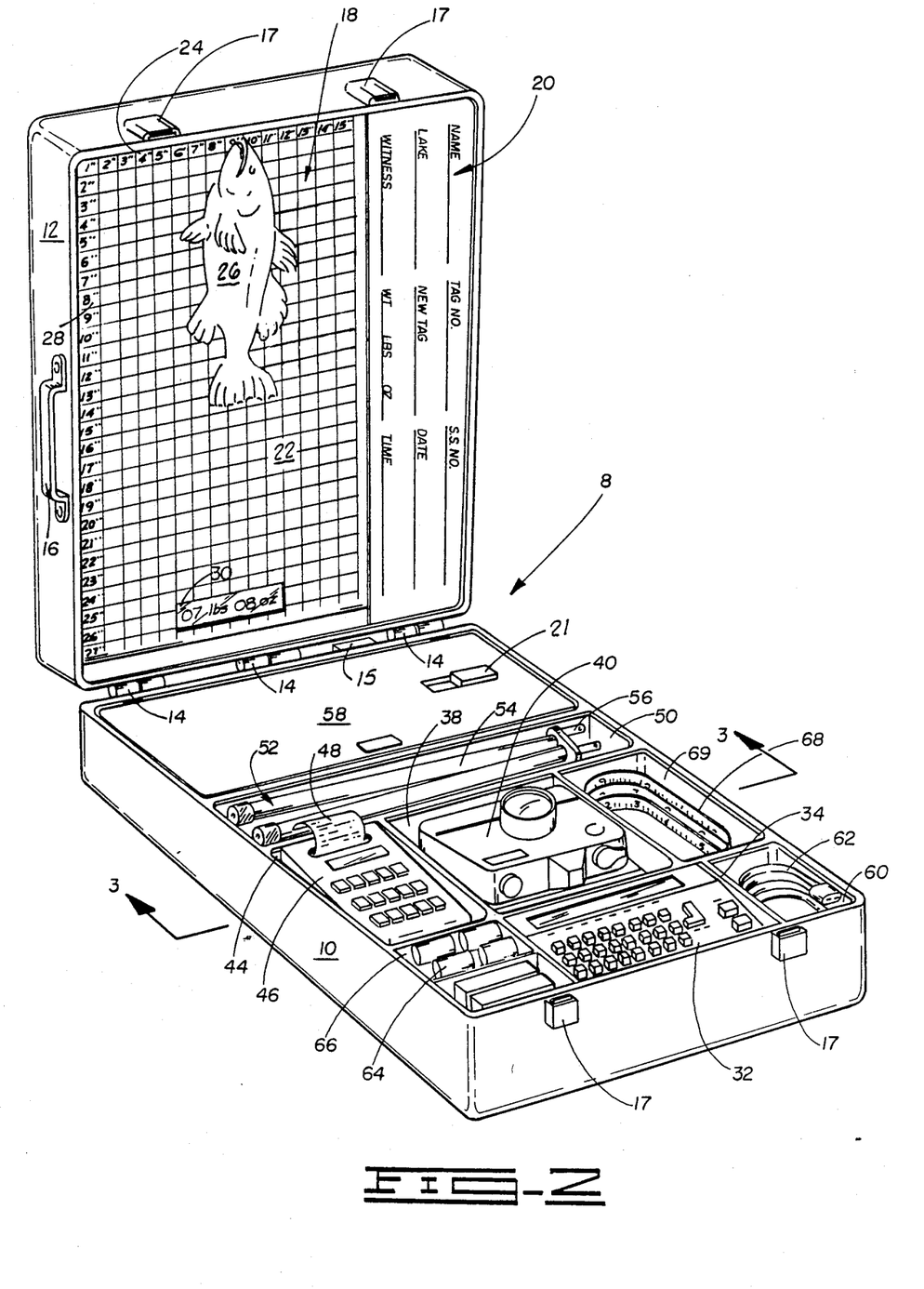
FIG. 2 is a perspective view which illustrates the data recording system of the invention as it appears when the carrying case is opened to its operative position, and illustrating a fish which has been caught and hung from a weight peg forming a part of a weighing and measuring subassembly mounted within a cavity defined by one side of the carrying case.

Referring to the drawings, the fish data recording system of the invention includes a carrying case 8 in which all of the primary operative components of the system are housed, and by which they are protected as they are carried from one location to another. The carrying case 8 includes two cavity-defining parts or halves 10 and 12, each of right parallelepiped configuration. The parts 10 and 12 are hinged together at the relatively narrow end of each of the parts, as shown at 14, so that parts 10 and 12 can pivot apart from each other as shown in FIG. 2. The parts are preferably provided with a suitable stop 15 so that they can be arrested and fixed in the illustrated position in which they extend at a right angle to each other. On one of the carrying case parts 10 or 12, a suitable handle 16 is provided, so that when the carrying case is closed with the parts latched together in the closed position by means of suitable latches 17, the carrying case can be carried with one hand.

It will be perceived from what has been said, and from the discussion which follows, that the carrying case 8, which houses all of the operative data recording components of the system of the invention, enables the fish data recording system to be easily carried on board a fishing boat. Its compact size enables it to be stowed in any convenient location on the boat until it is ready for use in measuring and recording data concerning a particular piscatorial species which has been caught, and which is of sufficient interest to warrant the recordation of data concerning the catch.

Carried within the cavity of the carrying case part 12 is a fish weighing and measuring subassembly 18. Also mounted in the cavity of the carrying case part 12 is an LCD (liquid crystal diode) data readout display 20.

The weighing and measuring subassembly 18 includes a scalar measuring grid 22 which has a horizontally extending abscissa linear scale 24, in inches, marked off along the upper side of the grid. In the illustrated embodiment, the total length of this particular scale is illustrated, merely by way of example, as being 15 inches. In approximately the center of the abscissa linear scale 24, a fish-supporting peg or element (not visible) is located and functions to support a fish 26 which has been caught. A vertically extending linear ordinate scale 28, graduated in inches appears to the left side of the grid 22 as it is viewed in FIG. 2 of the drawings. The scale 28 is illustrated as graduated up to 27 inches.

In the center of the lower portion of the grid 22, a window 30 permits viewing of an electronically energized digital weight readout display which, by means of associated electronic and mechanical mechanism interconnecting the display with the fish-supporting peg, registers the weight of a fish which is supported on the peg, as illustrated by the fish 26 shown in FIG. 2. For purposes of illustration, the weight readout appearing through the window 30 shows that the fish 26 weighs 7 lbs. 8 ounces. It will also be apparent by reference to the drawings that the fish which is hung from the peg has a length of about 15 inches and a width of about 5-7 inches, as clearly shown by the scalar measuring grid 22.

Before departing from the description of the fish weighing and measuring subassembly 18, it should be pointed out that a fish which is suspended upon the peg hangs flatly against the substantially monoplanar surface of the scalar grid 22 by which the dimensions of the fish are measured, so that the fish portrayed can be viewed over its entire length, and its identifying characteristics (as to the type of fish, including its body shape, scale colorations and configurations, etc.), are in full view and are centered against the scalar grid background.

The LCD data readout display 20 is an electronically developed readout of data which, in part, is input to the central processing unit of the computer system (carried in case part 12) via a keyboard 32. The keyboard 32 is disposed in a compartment formed by a partition 34 which delineates several variously sized compartments in the cavity defined by the carrying case part 10. Information which will typically be portrayed at the readout display 20, when input from the keyboard 32, will include the fisherman's name, an old tag number, if it is found that the fish has been previously caught and tagged, a new tag number of a new tag affixed to the fish, and the lake or the body of water where the fish has been caught. The data when the fish is caught, tagged and released is also entered, as well as the hour, and the name of any witness or guide who may be with the fisherman at the time of the catch,. The weight of the fish, in pounds and ounces, is automatically input from the weighing and measuring subassembly 18. The purpose of this electronic LCD data readout display, and the way it is used, will be subsequently explained.

Within the cavity defined by the case half 10 are additional compartments formed by the partition 34. Thus, a central compartment 38 contains a pre-focused camera 40 which is mounted within the compartment upon an expandable pedestal 42. The manner in which the pre-focused camera 40 is utilized, in association with the expandable pedestal 42, to photograph the fish 26 and the data display 20 exposed within the opposite part 12 of the carrying case 8 will be hereinafter explained.

In another compartment 44 defined by the partition 34, a small printer 46 is located and functions to develop a printed tab or tape 48 which carries substantially the same data as that which is portrayed by the LCD data display 20 upon input from the keyboard 32. This tab or tape 48 is retained by the fisherman when a photographic negative of the display 20, the fish 26 and the grid 22 is mailed in to the appropriate fish register as hereinafter explained. In another compartment 50 within the case part 10, a tripod 52 is located. The tripod 52 has telescoping legs 54, and a plurality of attachment pins 56 are provided at the upper side of the tripod for a purpose hereinafter described.

In a large compartment covered by a suitable removable lid 58 are located the batteries and power pack for operating the computer central processing unit, the keyboard 32, the printer 46 and all of the remaining electronic components of the system. Suitable electrical leads are extended from the power pack through the hinges 14 to the central processing unit located in the case part 12 behind the scalar grid 22.

Various other compartments are provided for the purpose of accommodating different accessories used with the data recording system of the invention. These compartments are provided within the cavity defined by the part 10, and are separated from each other, and defined, by the partition 34. Thus, another compartment 60 accommodates a power cord 62 which can be used for operating the system from a source of power, or for charging the batteries or power pack located within the battery and power pack compartment. Spare or extra batteries 64 can be disposed in another compartment 66 and a measuring tape 68 can be provided in compartment 69 for whatever use it may be needed.

Figure 4:
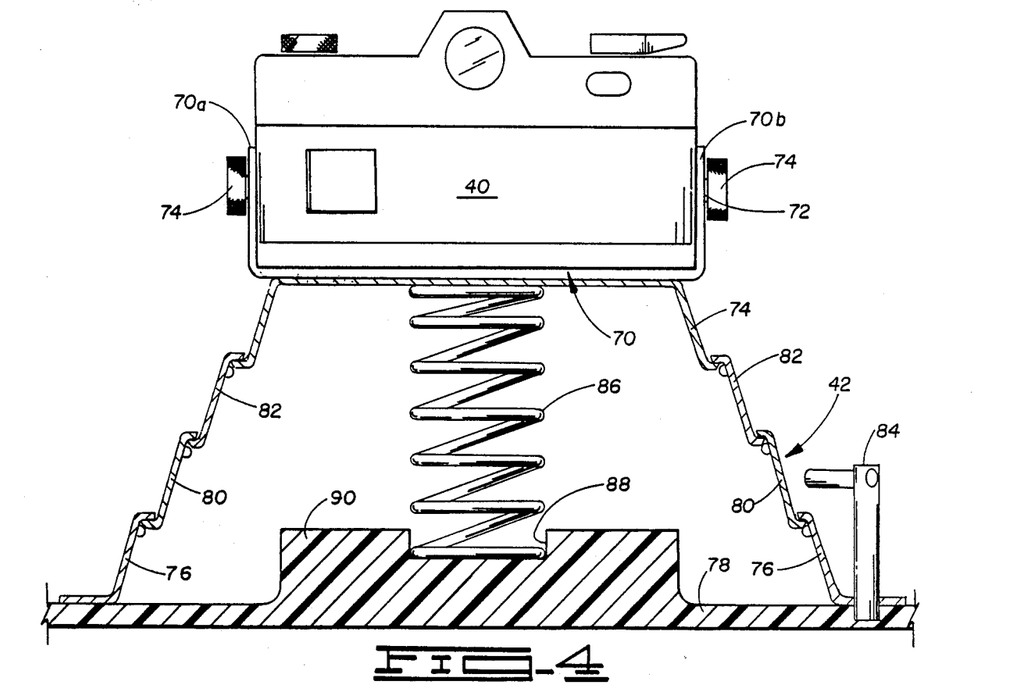
FIG. 4 is a view, partly in section and partly in elevation, illustrating the pre-focused camera forming a part of the invention, and illustrating the expandable pedestal upon which the camera is mounted within the carrying case.

As shown in FIG. 4 of the drawings, the pre-focused camera 40 is pivotally mounted upon a U-shaped bracket 70 so that the camera can be pivoted about an axis extending between the opposite end legs 70a and 70b of the bracket by means of a shaft 72 carrying manually rotatable knurled knobs or rollers 74 secured to its opposite ends. The manner in which this mechanism aids in aiming the camera 40 will be hereinafter explained.

The expandible pedestal 42, to which reference has previously been made, is made up of a plurality of interacting, mutually engaging telescoping sections. These include an upper, hat-shaped or trapezoidally-shaped section 74 supporting the bracket 70 in the manner illustrated in FIG. 4. A base section 76 is secured to the outside wall 78 of the part 10 of the carrying case, and is generally annular and is frustoconical in configuration,. The base section 76 has a relatively larger diameter than two interfitting, cooperating annular intermediate sections 80 and 82.

Figure 3:
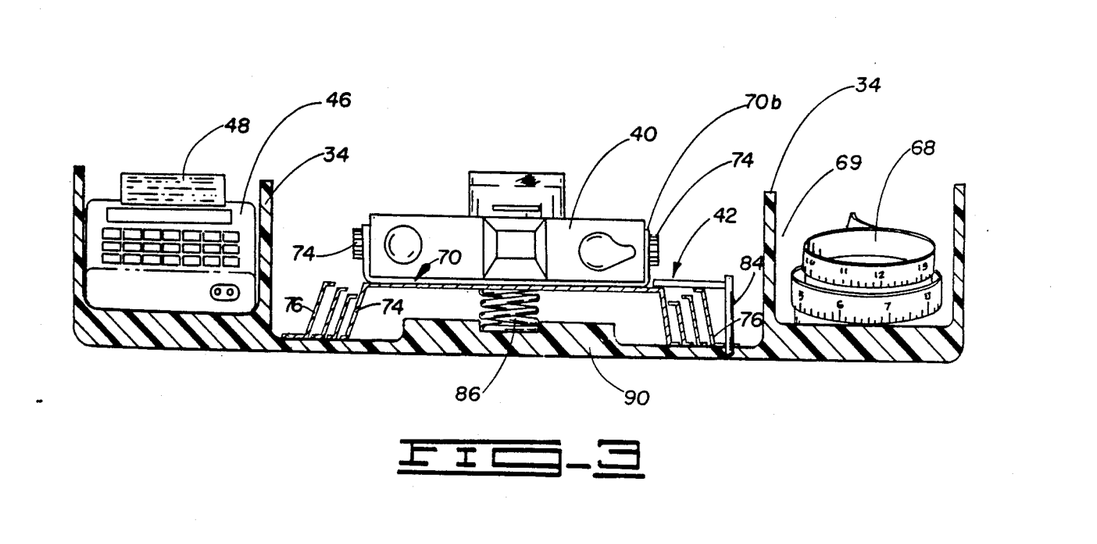
FIG. 3 is a sectional view taken along line 3—3 of FIG. 2.

The interfitting relationship of the pedestal sections 74, 76, 80 and 82, and the way they cooperate and relate during expansion of the pedestal 42 is illustrated in FIG. 4 of the drawings. Here it will be noted that these annular sections telescopingly interfit and can be collapsed into the nested position shown in FIG. 3 when the camera 40 is not in use, and needs to be stowed. When the camera 40 is to be elevated in order to photograph the LCD display 20 and the fish 26 as hereinafter described, a pivoting retainer latch 84 is manually released, and the camera is pulled outwardly until the pedestal 42 is in its expanded position. The camera 40 is then pivoted through 90° from the position depicted in FIG. 3 to the position depicted in FIG. 4, in which it is ready for photographic usage. The outward pull of the camera 40 to the pedestal-expanded position, and the retention of the camera in this status is aided by a coil spring 86 which has one end secured to the inner side of pedestal part 74, and its opposite end positioned in a small recess or cavity 88 which is formed in a tripod-engaging block 90 secured to, or formed integrally with, the wall 78.

Figure 5:
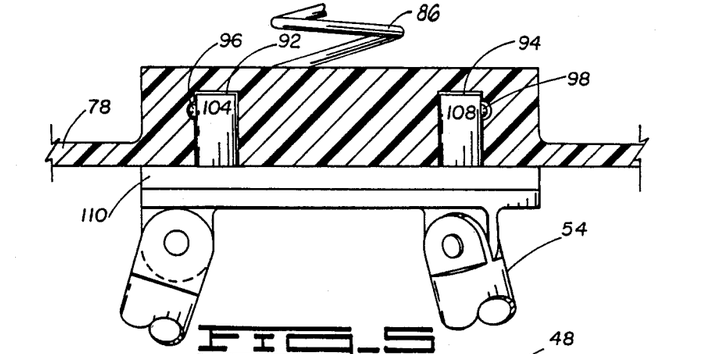
FIG. 5 is a view, partly in section and partly in elevation, illustrating the manner in which the upper end portion of a carrying case supporting tripod is engaged with tripod-receiving sleeves mounted in one side of the carrying case.
Figure 6:
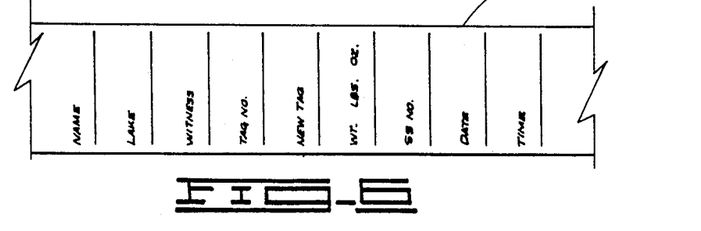
FIG. 6 is a view in elevation of a printout tape which is generated by the input of data via the keyboard forming a part of the present invention.

The illustrated tripod-engaging block 90 is preferably formed of a plastic material, which, in fact, is generally a suitable material of construction for the entire carrying case 8. The tripod-engaging block 90 defines at least three inwardly extending recesses or cavities which can suitably be lined with metal sleeves, if desired. Two of the sleeve-lined cavities are illustrated in FIG. 4, and the sleeves are there denominated by reference numerals 92 and 94. Preferably, the metal sleeves 92 and 94 have small lateral indentations or recesses 96 and 98, respectively, which are dimensioned to accommodate spring-biased, spherical elements or balls 100 and 102 movably mounted in recesses on the periphery of three engaging pins 104, 106 and 108. The engaging pins 104, 106 and 108 are secured in a triangular array on the upper side of a supporting plate 110 carried at the upper end, and forming a part, of the tripod 54. The arrangement and relative orientation of the several described parts at a time when the tripod 54 is in use for supporting the carrying case is depicted in FIG. 5.

Operation

In the use and operation of the catch and release data recording system of the invention, the carrying case 8 is quite portable and can be, as previously indicated, carried on board the boat by the fisherman with his tackle box and other paraphernalia. The compact carrying case 8 can be easily stored in any available space on the boat until it is needed for recording data concerning a catch.

After a fish 26 of significant size has been caught, the fisherman initially observes whether the fish carries a tag indicative of the fact that it has previously been caught, tagged and released. If such a tag is perceived on the fish, appropriate data is entered via the keyboard 32 and displayed on the LCD data readout display 20 indicating that fact. Next, the fish is tagged with an appropriate new tag provided in one of the several compartments defined by the partition 34 in the part 10 of the carrying case 8. Appropriate data from the new tag may be input into the LCD display 20 by the use of the keyboard 32. At the time that the keyboard 32 is used to input data into the LCD readout display 20, the data is also being recorded by the printer 46 on a tab or tape 48.

The fish 26 is next suspended from the peg forming a part of the weighing and measuring subassembly 18 as hereinbefore described. The opening of the carrying case 8 to the open status shown in FIG. 2, coupled with the pushing by the thumb of the main circuit switch 21, powers all of the electrical circuitry, and thus the weighing mechanism is actuated at this time. There is therefore a visual display of the weight of the fish 26 at the window 30, and this same information, in pounds and ounces, is automatically input to the LCD data display 20. The weight signal as thus developed is also input into the printer 46 upon the pressing of an appropriate key on the keyboard 32, and the weight is then printed on the tape 48. When the fish hangs from the peg with the scalar grid 22 immediately behind the fish, it is then possible to perceive the length and width of the fish, as well as the fish's bodily configuration and characteristics. The length of the fish 26 will usually be input to the LCD data display 20 by the use of the keyboard 32. As has been previously indicated, the name of the fisherman, the date of the catch and the time of the catch, as well as the name of any witness or guide present, are also data which are typed into the display 20 by means of the keyboard 32. Concurrently, a printed tape 48 bearing the same data or information is produced by the printer 46.

With the described data and information displayed on the LCD data readout display 20, the fish 26 hanging from the peg against the grid 22 and the fish weight visually depicted through the window 30, the data recording system is ready for the pre-focused camera 40 to be used to photographically record all of the described displayed information and the visual exhibit. In order to make such photographic record, the pre-focused camera 40 is pulled outwardly after the release latch 84 has been pivoted to unlatch the pedestal 42, and permit it to undergo telescopic expansion. The expansion of the pedestal 42 to its expanded position is aided by the coil spring 86 as the camera is pulled outwardly. When the pedestal 42 is in its fully extended position, the several annular sections of the pedestal are interlocked as shown in FIG. 4. The camera is then pivoted on the shaft 72 by the use of the knobs or rollers 74 so that it is aimed at the fish 26 and LCD display 20 on the opposite side of the case 8. This will generally entail rotation of the camera through an angle of about 90°.

As previously indicated, the camera 40 is pre-focused, based upon the distance between the top of the pedestal 42 where the camera is mounted and the objects to be photographed carried on the part 12 of the carrying case 8. To accomplish the photographing of the fish 26, the grid 22 and the LCD data readout display 20, the camera is preferably equipped with a suitable wide angle lens. After the camera has been aimed by the fisherman looking through a view finder, the film is exposed, thereby photographically recording, as a negative, the entire visual information exposure represented by the objects which are visible on the side 12 of the carrying case 8. The photographic negative will thus carry all of the information which is printed on the tape 48, but it will also have an actual picture of the fish 26 against the background of the grid 22.

After photographing the fish 26, the fish is released back to its habitat, carrying the tag which has been affixed by the angler. The photographic negative from the camera 40 is mailed to the particular registry which keeps records on the particular species of fish which has been caught (e.g. bass registry, crappe registry, or the like). The tape 48 is detached by the fisherman and placed in a safe location and serves as the fisherman's corroboration and proof of the content of the photographic negative.

The undeveloped film is, as indicated, mailed to the appropriate fish register (bass, trout, crappe, etc.), and there the negative is developed and the positive or developed picture is attached to a certificate verifying the fact of the catch, and the same is mailed back to the sportsman. The data and information concerning the catch is registered, and if warranted, an appropriate award is given to the angler and to his guide, and due recognition will generally be forthcoming in the media in the particular locale where the fish was caught. All of the information developed on the fish as it is caught, as well as that developed from any prior tagging resulting from a prior catching of the same fish, is compiled and made available to biologists who may be studying the life cycles of fish in that particular body of water.

It is contemplated that annual rewards will be made, and that recognition will be given for the most fish caught and released, the largest fish caught and released, both regionally and nationally, and with special attention and recognition directed to awards made to guides who promote the catch and release program.

Although a particular and specific embodiment of the invention has been herein described, it will be understood that various changes can be made in the illustrated embodiment of the invention without departure from the basic principle on which the invention is founded. Variations and changes of this type which continue to rely on those principles are therefore deemed to be circumscribed by the spirit and scope of the invention except as the same may be necessarily limited by the appended claims or reasonable equivalents thereof.

What is claimed is:

1. A portable system for recording information concerning a wildlife specimen, such system including:
    a two-part carrying case defining a hollow interior when the two parts are closed, and having the two parts hinged to each other for pivotally opening apart from each other upon pivotation about the hinges by which the parts are joined;
    an electronic weighing means mounted in a first of the parts of the carrying case for electronically weighing the wildlife specimen and developing a digital readout portrayal of the specimen weight while concurrently measuring, and visually portraying, at least one physical dimension of the specimen; and
    recording means mounted in the second part of the carrying case for simultaneously making two records, one of which is a written record, each of said records recording said specimen weight and physical dimension, whereby one of said records can be mailed to an official wildlife specimen registry and one of said records can be retained by the specimen collector.

2. A portable system for recording information as defined in claim 1 wherein said recording means for simultaneously making two records comprises:
    a camera for making a photographic record; and
    printing means including:
        a tape; and
        means for printing said specimen weight and physical dimension on the tape.

3. A portable system for recording information as defined in claim 2 and further characterized as including means connected to said second part and to said camera for adjusting the position of said camera and aiming said camera toward the center of said first part.

4. A portable system for recording, while on board a fishing boat, information concerning a caught fish, said system comprising:
    a carrying case having a pair of case halves hingedly interconnected to each other along one edge for opening and closing movement relative to each other;
    a handle on one of the case halves for carrying the closed case;

latch means for latching the closed halves in the closed position;

fish weighing and measuring means located within a first of said case halves and including:

means for visually portraying a fish in the course of weighing, and concurrently portraying a digital readout of the weight of such fish; and means for visually indicating the length of the fish concurrently with the weighing of the fish;

a liquid crystal diode data readout display carried in said first case half adjacent said weighing and measuring means and including a display panel with zones thereon for the visual display of information, including fish weight, fish length, fish species, date, location and fisherman;

a keyboard mounted within said second case half;

electronic signal conversion means between said keyboard and said data readout display panel for converting keyboard input to visual information displayed on said data readout display panel; and means for photographically recording the information visually appearing on said data readout display panel and concurrently photographically recording a fish being weighed and measured by said fish weighing and measuring means.

5. A portable system as defined in claim 4 and further characterized as including a printer electronically connected to said keyboard for printing out a tape setting forth the information input into said keyboard; including that information visually portrayed on said data readout display panel, whereby a fisherman may concurrently develop a photographic record and a printed tape containing data and information regarding a caught fish.

6. A portable system as defined in claim 5 and further characterized as including:

means for stopping the movement of said case halves relative to each other in a position in which the halves extend at substantially a right angle with respect to each other, whereby said second case half can be rested upon a horizontally extending surface, and said first case half can then extend vertically so that a fish can be vertically suspended against, and supported upon, said first half for purposes of weighing;

a camera; and expandable means mounting said camera in said second half and movable to a position at which said camera faces said first half and a fish supported thereupon when said halves extend at substantially a right angle with respect to each other.

7. A portable system as defined in claim 4 wherein said fish weighing and measuring means further includes a linear scale for visually indicating the width of the fish while it is being weighed.

8. A portable system as defined in claim 4 and further characterized as including:

means for stopping the movement of said case halves relative to each other in a position in which the halves extend at substantially a right angle with respect to each other, whereby said second case half can be rested upon a horizontally extending surface, and said first case half can then extend vertically so that a fish can be vertically suspended against, and supported upon, said first half for purposes of weighing;

a camera; and expandable means mounting said camera in said second half and movable to a position at which said camera faces said first half and a fish supported thereupon when said halves extend at substantially a right angle with respect to each other.

9. A portable system as defined in claim 4 and further characterized as including:

a tripod carried in said case and removable therefrom; and means for interconnecting said tripod with said case for supporting said case on said tripod.

10. A portable system as defined in claim 9 and further characterized as including a printer electronically connected to said keyboard for printing out a tape setting forth the information input into said keyboard; including that information visually portrayed on said data readout display panel, whereby a fisherman may concurrently develop a photographic record and a printed tape containing data and information regarding a caught fish.

11. A portable system for recording, while on board a fishing boat, information concerning a caught fish, said system comprising:

a carrying case having a pair if case halves hingedly interconnected to each other along one edge for opening and closing movement relative to each other;

means for stopping the movement of said case halves relative to each other in a position in which the halves extend at substantially a right angle with respect to each other, whereby said second case half can be rested upon a horizontally extending surface and said first case half can then extend vertically so that a fish can be vertically suspended against, and supported upon, said first half for purposes of weighing;

a handle on one of the case halves for carrying the closed case;

latch means for latching the closed halves in the closed position;

fish weighing and measuring means located within a first of said case halves and including:

means for visually portraying a fish in the course of weighing, and concurrently portraying a digital readout of the weight of such fish; and means for visually indicating the length of the fish concurrently with the weighing of the fish;

a liquid crystal diode data readout display carried in said first case half adjacent said weighing and measuring means and including a display panel with zones thereon for the visual display of multiple items of information;

a keyboard mounted within said second case half;

electronic signal conversion means between said keyboard and said data readout display panel for converting keyboard input to visual information displayed on said data readout panel; and means for photographically recording the information visually appearing on said data readout display panel and concurrently photographically recording a fish being weighed and measured by said fish weighing and measuring means, said means for photographically recording the information comprising:

a camera; and expandable means mounting said camera in said second case half and movable to a position at which said camera faces said first half and a fish supported thereon when said halves extend at substantially a right angle with respect to each other.

12. A portable system for recording information concerning a wildlife specimen, such system including:
   a two-part carrying case defining a hollow interior when the two parts are closed, and having the two parts hinged to each other for pivotally opening apart from each other upon pivotation about the hinge by which the parts are joined;
   an electronic weighing means mounted in a first of the parts of the carrying case for electronically weighing the wildlife specimen and developing a digital readout portrayal of the specimen weight while concurrently measuring and visually portraying, at least one physical dimension of said specimen; and
   means mounted in the second part of the carrying case for simultaneously making two records, at least one of which is written, recording said specimen weight and physical dimension, whereby one of said records can be mailed to an official registry, and one of said records can be retained by the wildlife specimen collector, said means for simultaneously making two records further comprising:
      a camera for making a photographic record; and
      printing means including:
         a tape; and
         means for printing at least said speciman weight and physical dimension on the tape;
   means connected to said second case part and to said camera for adjusting the position of said camera and aiming said camera toward the center of said first part.

13. A catch and release fish data recording system comprising:
   a carrying case having two cavity-defining parts hingedly interconnected to facilitate pivotation of the parts relative to each other from a first, closed position, in which the case is closed, to a second, open position in which a first of said parts extend substantially normal to the second of said parts after pivoting through an angle of about 90° from said closed position;
   a fish weighing and measuring subassembly mounted in said first case part, and including:
      means for measuring and visually portraying the length of a fish; and
      means for weighing said fish;
   means connected to said weighing means for reacting to the weight of said fish to visually and digitally portray the weight of said fish adjacent said means for measuring and visually portraying the length of the fish; and
   a camera mounted in said second case part and positionable by limited movement, without detachment from said second case part, for photographing said means for visually portraying the length of said fish, a fish suspended on said weighing means, and the visually and digitally portrayed weight of said fish at the time when said case parts are in said second, open position.

14. A catch and release fish data recording system comprising:
   a pair of mating cavity-defining parts interconnectable to each other in a first, closed position to form a case having an encloure on the interior thereof, and interconnectable to each other in a second, open position in which the two parts of the case extend at an angle of at least about 90° to each other;
   a fish weighing and measuring subassembly mounted in one of said parts, and including:
      a measuring grid for measuring and visually portraying the length of a fish; and
      means for weighing a fish comprising:
         a suspending element upon which a fish can be retained in position against said grid in a position to be measured thereby; and
         means for weighing the fish while it is positioned against said grid and on said suspending element;
   means to visually portray in a digital fashion, the weight of said fish in response to said weighing means and at a location adjacent said grid; and
   a camera mounted in the other part of said two-part case and positionable by limited movement, and without detachment from said other part of said case, for photographing said grid, a fish positioned adjacent said grid, and the visually and digitally portrayed weight of said fish at the time when said two case parts are in said second position.

* * * * *

UNITED STATES PATENT AND TRADEMARK OFFICE
CERTIFICATE OF CORRECTION

PATENT NO. : 4,839,675

DATED : June 13, 1989

INVENTOR(S) : H. Drew Owen

It is certified that error appears in the above-identified patent and that said Letters Patent is hereby corrected as shown below:

In Column 2, line 11, delete "weight" and insert -weigh-.

In Column 2, line 54, delete "recoding" and insert -recording-.

In Column 12, line 21, delete "encloure" and insert -enclosure-.

Signed and Sealed this

Sixth Day of February, 1990

*Attest:*

JEFFREY M. SAMUELS

*Attesting Officer*   *Acting Commissioner of Patents and Trademarks*